Dec. 3, 1957

H. F. McKENNEY ET AL 2,815,169

SECANT SOLVER

Filed April 23, 1952

INVENTORS
HENRY F. McKENNEY.
RICHARD C. GILBERT.

BY

ATTORNEY

2,815,169

SECANT SOLVER

Henry F. McKenney, Valley Stream, and Richard C. Gilbert, Rego Park, N. Y., assignors to Sperry Rand Corporation, a corporation of Delaware Application April 23, 1952, Serial No. 283,914

5 Claims. (Cl. 235—61)

This invention relates to a device for computing secants and particuuarly to a circuit arrangement which improves the accuracy of the device over a wide range of input voltage.

In the usual secant computer a synchro resolver is employed for the purpose of establishing the relation between the input and output voltages in terms of trigonometric function. It can be easily demonstrated that where $E_1$ represents the input voltage and $E_0$ the output voltage they are proportioned to each other approximately as the sec $\phi$ is to a certain constant K or in other words $E_0$ is approximately equal to $$-E_1 \frac{\sec \phi}{K}$$

$\phi$ is the angle of the secondary coil of the resolver relative to the primary coil may be either the rotor or stator. The constant K is the transformation ratio of the resolver. The output of the resolver is, therefore, a function of K as well as the secant of $\phi$. Ideally K should be constant for all values greater than zero of the impressed voltage on the primary of the resolver but actually it falls off as the voltage approaches zero. The value of K starts to decrease fairly slowly at first and then falls sharply to zero when the voltage is very small. This invention provides a compensator for the output voltage $E_0$ which prevents K from becoming greater in value than a certain maximum which is less than K would attain if there were no compensation. The advantage thus sought is that the desired transformation ratio is reached at a smaller impressed voltage on the resolver. The device can accordingly be operated at lower voltages with less sacrifice of efficiency and accuracy than is otherwise possible.

It is an object of the present invention to provide a simple and efficient compensator for a secant computer which will permit said computer to operate over a greater range of voltages.

Reference will now be made to the accompanying drawing which illustrates one embodiment of the computer circuit.

According to the present invention a signal or input voltage $E_1$ is introduced into a network box 10 for algebraicly adding electrical quantities. The network box is cascaded with a high gain amplifier 11, the output voltage $E_0$ of the latter being fed back into the network box 10 through synchro resolver 12 to be algebraicly added to the input voltage $E_1$. The resulting voltage, when stepped up by the amplifier 11 is approximately proportional to the secant of the angle $\phi$. This can be shown by the following expressions for uncompensated output $E_{00}$:

(1) $$\frac{E_{00}}{E_1} = \frac{A_0}{k - A_0 K \cos \phi}$$

(2) $$\frac{E_{00}}{E_1} = \frac{-1}{K \cos \phi} \text{ (approximately)}$$

where $A_0$ is the amplification of the amplifier 11, K is the transformation ratio of the resolver 12, $\phi$ is the angle mechanically set in the resolver and $k$ is the feedback constant of the network box 10—a value between zero and one.

Equation 2 for the output is an approximation but a very nearly true equation because the amplification $A_0$ is very high having a value of approximately 20,000. The input signal $E_1$ is easily controlled and certain of determination. It will be seen however from the graph of Fig. 2 that K, represented by the continuous line, is contant for the larger values of $E_0$ but that it begins to fall off gradually at first and then more sharply as $E_0$ approaches zero. For the lower voltages, therefore, the output of the system is too large. It is apparent that it would be desirable to maintain K more nearly at constant level at these voltages, and that is the special purpose of this invention.

Figure 1:
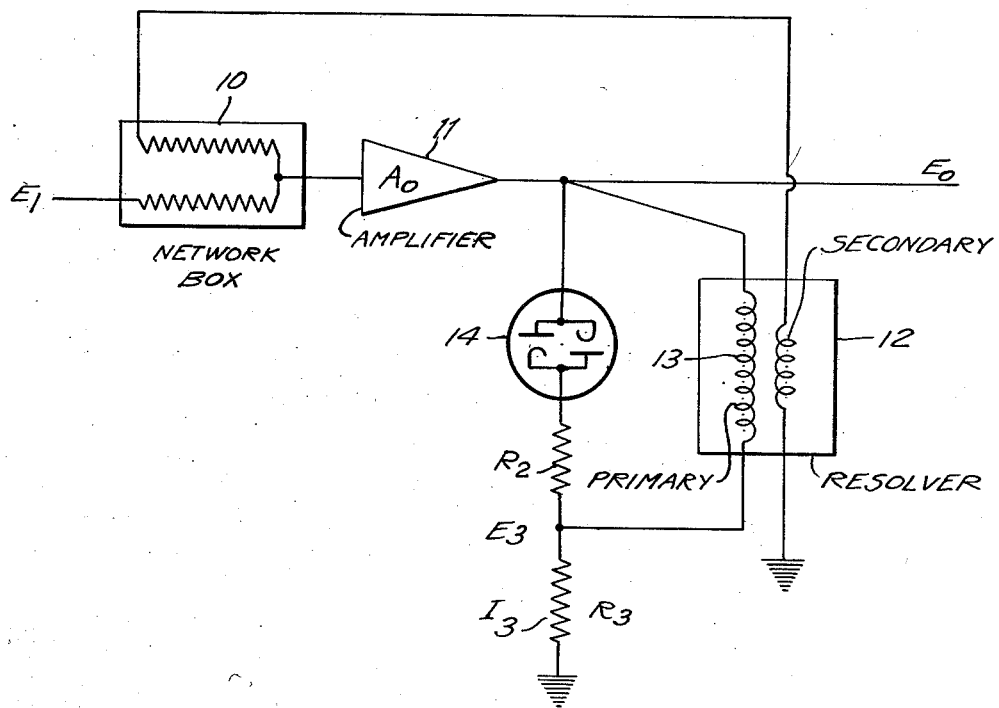
Fig. 1 is a schematic diagram of the invention including the compensator.

This objective is accomplished by compensating the output in a manner such as is illustrated in Fig. 1. In parallel with the primary coil 13 of the resolver of resistance $R_1$ is double diode 14 and a resistance $R_2$. The electrodes of one set in the diode 14 are oppositely poled to the electrodes on the other set to permit its use in an alternating current circuit. The parallel primary and diode circuits are joined at a common connection below the resistance $R_2$ and the circuit is grounded through a resistance $R_3$. The function of the compensator circuit is to control the output voltage $E_0$ by adding to it a component which varies oppositely with the voltage across the primary coil of the resolver. This is possible because the impedance of the diode varies inversely with the voltage. At higher voltages the impedance is reduced and current is drawn in parallel with the primary coil of the resolver. After the union of the two branch circuits the resulting current $I_3$ and voltage drop $E_3$ across the resistance $R_3$ increase more rapidly than the voltage $E_0$. As a result of the $E_0$ compensation there is established in the resolver 12 a new transformation ratio K' represented by the broken line on the graph of Fig. 2. K' remains constant for lower voltages than does K.

The greater constancy of K' with $E_0$ compensation can be proved mathematically. Letting $Z_{R_1}$ represent the resolver primary impedance and Z the diode impedance, the derivations may be set forth as follows:

(3) $$E_0 = E_{00} + E_3$$

(4) $$E_0 = \frac{A_0 E_1 + E_3}{k - A_0 K \cos \phi}$$

(5) $$E_3 = (E_0 - E_3)\left(\frac{1}{Z_{R_1}} + \frac{1}{Z + R_2}\right) R_3$$

(6) Let $Y = \frac{1}{Z_{R_1}} + \frac{1}{Z + R_2}$ $$E_3(1 + YR_3) = E_0(YR_3)$$

(7) $$E_3 = E_0\left(\frac{YR_3}{1 + YR_3}\right)$$

(8) $$E_0 = E_{00} + E_0\left(\frac{YR_3}{1 + YR_3}\right)$$

(9) $$E_0 = \frac{E_{00}}{1 - \left(\frac{YR_3}{1 + YR_3}\right)}$$

(10) $$E_0 = E_{00}(1 + YR_3)$$

(11) $$\frac{E_0}{E_1} = \frac{-\sec \phi}{K}\left[1 + R_3\left(\frac{1}{Z_{R_1}} + \frac{1}{Z + R_2}\right)\right]$$

(12) $$\frac{E_0}{E_1}=\frac{-\sec\phi}{K'}$$

(13) $$K'=\frac{K}{1+R_3\left(\frac{1}{R_1}+\frac{1}{Z+R_2}\right)}$$

Figure 2:
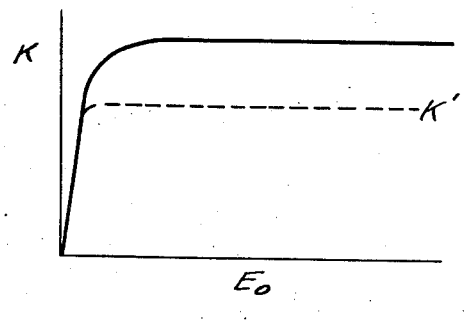
Fig. 2 is a graph showing the compensated and uncompensated values of the transformation ratio K of the synchro resolver over a range of output voltages.

Formula 13 has significance in its indication that K' remains constant at low voltages. As for example, where $E_0$ is low and K is accordingly low and Z high, K' has a tendency to stay constant. The compensated value of $E_0$ thus remains the true value for the secant of $\phi$ as modified by the signal input $E_1$ and the new transformation ratio over a wider range of input voltages as shown in Fig. 2. Because K' is artificially depressed, compensated $E_0$ has a higher constant value than uncompensated $E_{00}$.

The computer utilizes standard electrical equipment. The network box 10 is composed of resistance coils with a common output terminal. The high gain amplifier 11 is a voltage and power amplifier. The synchro resolver 12 is a standard unit for solving sine and cosine vectoral components. It is therefore clear that with only slight modification the computer could be used to solve for the cosecant.

Having thus described our circuit arrangement for a secant computer, we claim as new therein:

1. A secant computer comprising a synchro resolver having primary and secondary coils, means for algebraically adding the output of said synchro resolver to an input signal, a high gain amplifier cascaded with said means, a compensator circuit connected to the output of said amplifier and comprising as a series combination an element the impedance of which varies in an opposite sense with the voltage impressed thereon and a resistance in series with said element, said series combination being connected in parallel with the primary coil of said synchro resolver, and a grounded resistance connected in series with said primary coil and said series combination.

2. A secant computer comprising a synchro resolver having primary and secondary coils, means for algebraically adding the output of said synchro resolver to an input signal, a high gain amplifier cascaded with said means, a compensator circuit connected to the output of said amplifier and comprising as a series combination a double diode tube having two sets of electrodes oppositely poled to permit passage of current in both directions and a resistance in series with said tube, said series combination being connected in parallel with the primary coil of said synchro resolver, and a grounded resistance connected in series with said primary coil and said series combination.

3. A secant computer comprising a synchro resolver having primary and secondary coils, a network box, a grounded secondary coil circuit for feeding the output of the resolver to the network box where it is algebraically added to the input signal, a high gain amplifier cascaded with said network box, a primary coil circuit connected to the output of said amplifier and comprising as a series combination a double diode tube having two sets of electrodes oppositely poled to permit passage of current in both directions and a resistance in series with said tube, said series combination being connected in parallel with the primary coil circuit, and a grounded resistance connected in series with said primary coil and said series combination.

4. For a secant computer which comprises a synchro resolver having primary and secondary coils, a compensator circuit for compensating the output of the computer comprising as a series combination an element the impedance of which varies in an opposite sense with the voltage impressed thereon and a resistance in series with said element, said series combination being connected in parallel with a primary coil of said synchro resolver, and a grounded resistance connected in series with said primary coil and said series combination.

5. For a secant computer which comprises a synchro resolver having primary and secondary coils, a compensator circuit for compensating the output of the computer comprising as a series combination a double diode tube having two sets of electrodes oppositely poled to permit passage of current in both directions and a resistance in series with said tube, said series combination being connected in parallel with the primary coil of said synchro resolver, and a grounded resistance connected in series with said primary and said series combination.

References Cited in the file of this patent

UNITED STATES PATENTS

| | | |
|---|---|---|
| 1,990,261 | Young | Feb. 5, 1935 |
| 2,340,429 | Rankin | Feb. 1, 1944 |
| 2,465,624 | Agins | Mar. 29, 1949 |
| 2,467,646 | Agins | Apr. 19, 1949 |
| 2,512,637 | Frazier | June 27, 1950 |

OTHER REFERENCES

Electronic Instruments, Greenwood, Holdham & MacRae, Radiation Lab. Series published by McGraw-Hill Book Co., Inc., New York, 1948, pages 118–120.